United States Patent [19]

Hurtig

[11] 4,047,462
[45] Sept. 13, 1977

[54] TOGGLE BOLT
[75] Inventor: Carl R. Hurtig, Cohasset, Mass.
[73] Assignee: Encor Limited, Cohasset, Mass.
[21] Appl. No.: 671,411
[22] Filed: Mar. 29, 1976
[51] Int. Cl.² ........................................... F16B 21/02
[52] U.S. Cl. ..................................................... 85/3 R
[58] Field of Search ................... 85/3 R, 3 S, 3 K, 68, 85/11; 24/211 P, 211 R

[56] References Cited
U.S. PATENT DOCUMENTS

| 2,406,536 | 8/1946 | Gelpcke | 85/68 |
| 3,605,547 | 9/1971 | Millet | 85/3 S |

FOREIGN PATENT DOCUMENTS

| 130,259 | 11/1948 | Australia | 85/3 R |
| 934,263 | 1/1948 | France | 85/68 |
| 1,464,833 | 11/1966 | France | 85/3 R |

Primary Examiner—Ramon S. Britts
Attorney, Agent, or Firm—Weingarten, Maxham & Schurgin

[57] ABSTRACT

A toggle bolt capable without disassembly or reassembly of cutting a mounting hole through a wall and being easily installed therein. The toggle bolt includes a generally tubular sleeve having an internally threaded collar pivotally mounted at a position along the longitudinal axis of the sleeve such that the sleeve includes a heavier portion between the collar and one end and a lighter portion between the collar and the opposite end. One of the sleeve ends has cutting teeth or other cutting configuration, and a slot is provided in the wall of the sleeve along the lighter portion thereof. A bolt is threaded into the collar and is disposable transversely of the sleeve during drilling of a mounting hole and is disposable via the slot coaxially of the sleeve for insertion of the sleeve through the mounting hole for anchoring therein.

6 Claims, 6 Drawing Figures

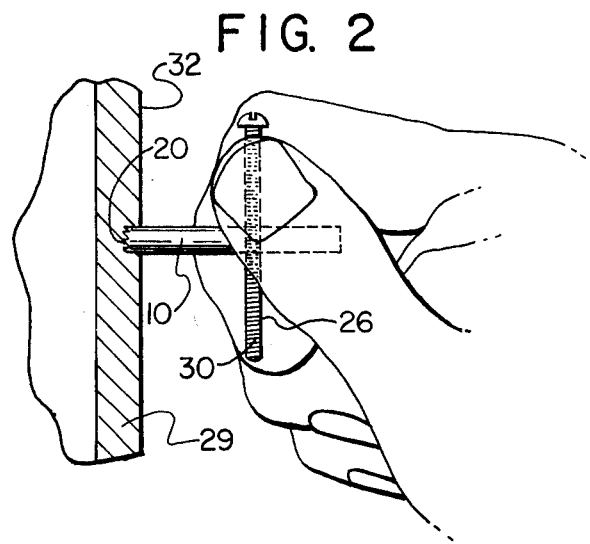
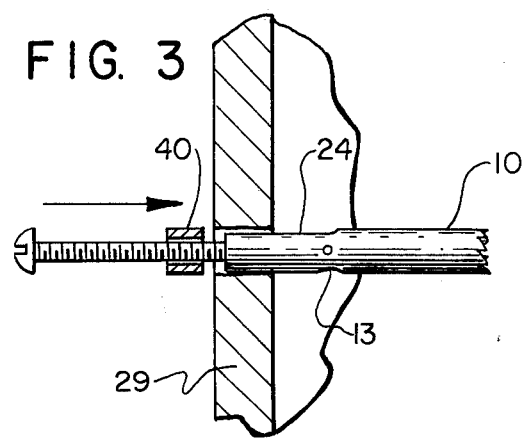
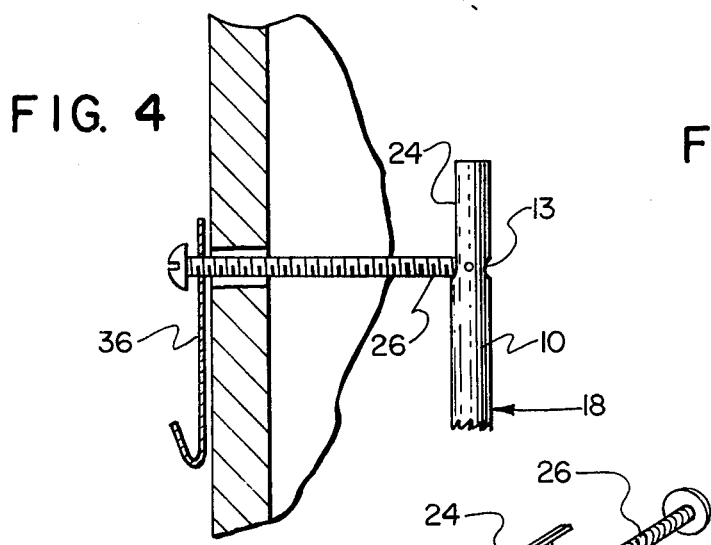
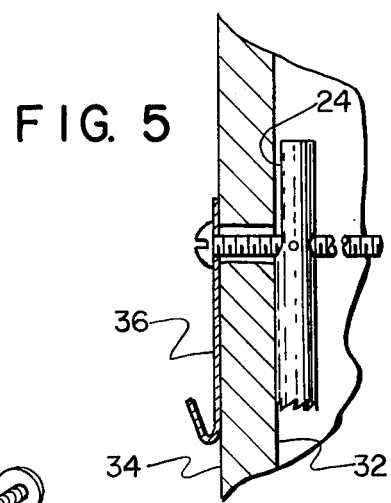
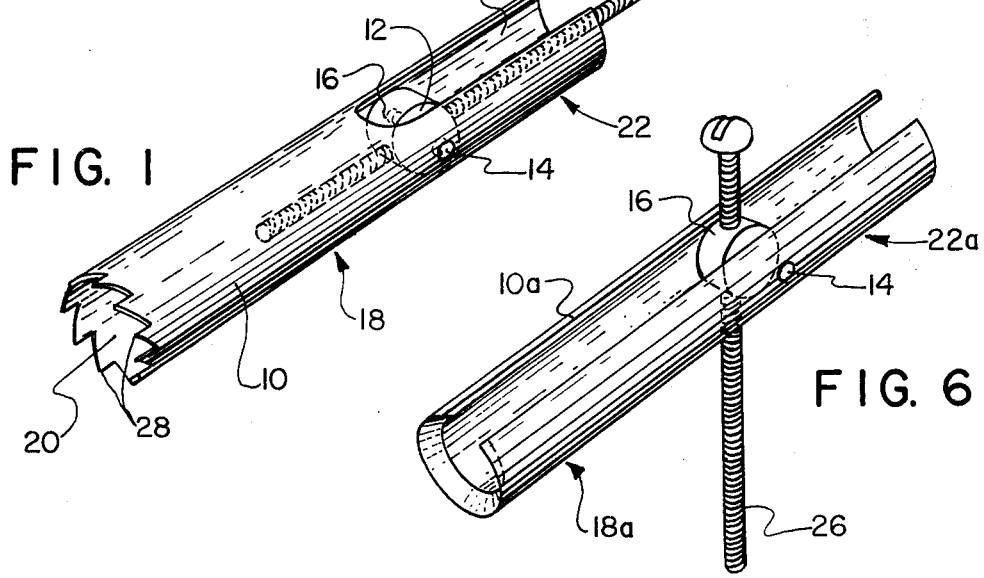

TOGGLE BOLT

FIELD OF THE INVENTION

This invention relates to fasteners and more particularly to toggle bolts for engagement of the back surface of a hollow wall or other partition via a hole provided therethrough.

BACKGROUND OF THE INVENTION

Various fasteners are known for securing an item to a hollow wall or partition by anchoring the fastener to the rear surface of the hollow wall via a hole provided therethrough. For example, one well-known toggle bolt employs a pair of hinged wings threaded onto a bolt and held in a normally open or outwardly extending position by means of a spring. The wings are folded toward one another for insertion through a previously drilled hole in a hollow wall, such as a plaster or plasterboard wall, the wings snapping open after passage through the hole. The open wings are drawn via the threaded bolt against the rear wall surface and the bolt tightened against the front wall surface to anchor the fastener, to the front end of which is connected a picture hook, bracket or other item being fastened to the wall. Such toggle bolts of conventional construction are widely employed and provide good holding action for many purposes. However, a hole must be provided in the wall substantially larger than the bolt diameter to accommodate the relatively large hinged wing assembly which must be passed through the hole to the rear of the wall for anchoring therein. Moreover, the mounting hole must be drilled or reamed by a separate drill bit or other suitable tool. As a further disadvantage, the wing assembly can wrongly be installed backwards on the bolt in which event firm anchoring is not achieved. The wings must also be drawn against the rear wall surface to tighten the bolt and prevent rotation of the wings.

Various alternative toggle bolt structures have been proposed heretofore. In U.S. Pat. No. 3,782,238 an anchor plate to which a bolt is threaded and secured to the rear surface of a hollow wall is configured to serve as a drill bit for provision of a mounting opening in the wall. When use as a drill bit, the plate must be disassembled from the fastener bolt and employed with a conventional hand or power drill, and after the hole is made, the plate must then be reinstalled onto the fastener bolt at a specially configured end thereof such that the plate is colinear with the bolt axis for insertion through the mounting hole. After insertion of the bolt and plate through the hole, the bolt is twisted to cause the mounting plate to assume a transverse disposition for anchoring against the rear wall surface as the bolt is tightened. Other fasteners of known construction are shown in U.S. Pat. Nos. 2,908,196; 1,409,626; 608,717; and 2,578,515.

SUMMARY OF THE INVENTION

Briefly, the present invention provides a relatively simple yet highly efficient and reliable toggle bolt capable without disassembly or reassembly of cutting a mounting hole through a wall and then being easily installed therein. The mounting hole is substantially smaller than the hole required for a correspondingly sized toggle bolt of conventional wing construction, and the mounting hole is readily cut by the cutting portion of the novel structure with minimal tearing or chipping of the wall surfaces. The novel toggle bolt structure includes a generally tubular sleeve having an internally threaded collar pivotally mounted at a position along the longitudinal axis of the sleeve such that the sleeve includes a heavier portion between the collar and one end of a lighter portion between the collar and the opposite end. A channel or slot is provided in the wall of the sleeve extending longitudinally along the lighter portion of the sleeve, the slot being sized to accommodate a bolt threadably mated with the pivotably disposed collar. One end of the tubular sleeve includes a series of cutting teeth or other cutting configuration suitable for cutting a circular opening through a wall to which the toggle bolt is to be mounted.

In use, the bolt is threaded through the collar in a position generally transverse to the axis of the sleeve and the cutting end of the sleeve is positioned on the outer surface of a wall at the location of the mounting hole. The sleeve is rotated or reciprocated manually by use of the outwardly extending portions of the bolt to drill an opening through the wall, the opening having a diameter approximating the outside diameter of the sleeve. Alternatively, the bolt can be removed from the threaded collar and the sleeve inserted into a drill for use as a bit for provision of the mounting hole. After cutting of the mounting hole, the bolt is threaded out of the collar until the end of the bolt is within the collar or within the tubular sleeve such that the collar and bolt can be pivoted approximately 90° for alignment of the bolt within the sleeve and generally colinear therewith. In this colinear disposition, the assembly is rotated to a position where the slot is facing generally upward such that the sleeve will remain in colinear disposition. The sleeve is then inserted through the previously provided mounting hole until the sleeve is completely through the hole, at which time the sleeve is rotated approximately 180° to dispose the slot downwardly to permit the heavier end of the sleeve to drop to a position transverse to the axis of the threaded bolt. The bolt is then tightened to draw the sleeve against the rear wall surface, and anchor the bolt.

DESCRIPTION OF THE DRAWINGS

The invention will be more fully understood from the following detailed description taken in conjunction with the accompanying drawings, in which:

FIG. 1 is a pictorial view of a toggle bolt according to the invention;

FIG. 2 is a partly sectional side view illustrating operation of the invention in cutting a mounting hole;

FIG. 3 is a partly sectional side view illustrating insertion of the toggle bolt through a mounting hole;

FIG. 4 is a partly sectional side view illustrating the disposition of the toggle bolt after insertion through a mounting hole;

FIG. 5 is a partly sectional side view illustrating the toggle bolt in anchored position; and FIG. 6 is a pictorial view of a toggle bolt of alternative embodiment.

DETAILED DESCRIPTION OF THE INVENTION

A toggle bolt constructed and operative according to the invention is illustrated in FIG. 1 and includes a generally tubular sleeve 10 of uniform wall thickness and having an internally threaded collar 12 pivotally mounted therein by means of pivot pins 14 and 16 cooperative with respective openings provided in the wall of sleeve 10 and disposed at an axial position offset from the longitudinal center of sleeve 10 such that the sleeve has a longer and thus heavier portion 18 between collar 12 and a cutting end 20, and a shorter and lighter portion 22 between collar 12 and the opposite end of sleeve 10. A slot 24 is provided in the wall of sleeve 10 extending longitudinally along the shorter portion 22. A bolt or machine screw 26 is threadably mated with the internal threads of collar 12 and is of a diameter to pass through slot 24 into longitudinal generally coaxial alignment with sleeve 10. The cutting end 20 of sleeve 10 includes a plurality of cutting teeth 28 or other cutting configuration suitable for cutting a circular opening through a wall and in which opening the toggle bolt is to be secured.

The sleeve 10 can be of many different materials depending upon the degree of strength required and the nature of the wall material through which an opening must be cut by the cutting end of the sleeve. The sleeve can be, for example, of aluminum or stainless steel and can be readily fabricated from tube stock in which slot 24 is cut and cutting end 20 formed. Alternatively, the sleeve 10 can be molded of a suitable plastic material with the entire sleeve configuration integrally formed without additional fabricating steps. The collar and its pivot pins are dimensioned to provide the requisite strength.

For use in cutting a mounting opening through a wall, bolt 26 is threaded through collar 12 and through an opening 13 in sleeve 10 in a position generally transverse to the axis of sleeve 10, as shown in FIG. 2, and cutting end 20 is positioned on the outer surface of a wall 29 at the location at which a mounting hole is to be provided. The sleeve and its cutting end is manually rotated or reciprocated by use of the outwardly extending portions 30 and 32 of bolt 26 to drill an opening through the wall, this opening having a diameter approximating the outside diameter of sleeve 10. A clean hole can be readily drilled with minimal tearing or chipping of the wall surfaces. After drilling of the mounting hole through the wall, the bolt 26 is threaded out of collar 12 until the end of the bolt is within threaded opening of collar 12 or within sleeve 10 to permit rotation of the collar and bolt by approximately 90° for axial alignment of bolt 26 within sleeve 10. Such pivoting of bolt 26 with respect to sleeve 10 can be accomplished with the end portion 18 of sleeve 10 within the mounting hole or after removal of sleeve 10 from the mounting hole upon completion of the drilling operation. With bolt 26 in generally colinear disposition within sleeve 10, the assembly is rotated to a position where slot 24 faces generally upward, such that sleeve 10 remains colinearly disposed about bolt 26.

Sleeve 10 is next inserted through the mounting hole (FIG. 3) until the sleeve is completely through the hole, at which time the sleeve is rotated approximately 180° to dispose slot 24 downwardly to permit the heavier portion 18 to drop to a position generally transverse to the axis of bolt 26, as shown in FIG. 4. Bolt 26 is next tightened to draw sleeve 10 against the rear wall surface 32, as illustrated in FIG. 5, to anchor the entire toggle bolt assembly in position between wall surfaces 32 and 34. A picture hook 36 or other item being fastened is shown secured to bolt 26 on front wall surface 34. Depending on the nature of the item being fastened, bolt 26 may or may not need disassembly from sleeve 10 prior to insertion of the sleeve through the mounting hole. It will be appreciated that the toggle bolt can be removed from its mounting hole by reversing the installation procedure described above.

In the transverse position, the heavier downward end of sleeve 10 serves as a pendulous mass such that bolt 26 can be tightened without pulling the sleeve against the rear wall surface, since sleeve 10 tends to remain stationary as the bolt is threaded through the collar. During drilling of a mounting hole, a core of wall material, such as plaster, often remains within sleeve 10 and thus adds to the weight and pendulosity of the heavier sleeve portion. A bushing 40 (FIG. 3) can be installed in the mounting hole in the event that bolt 26 is to be centered in the hole.

An alternative embodiment is shown in FIG. 6 in which sleeve 10a includes a slot along its entire length. This sleeve is typically formed from a flat piece of metal or other suitable material which is then formed into the illustrated tubular shape. The cutting end includes a beveled knife edge 28a providing a circular cutter for formation of the mounting hole. It will be appreciated that the novel toggle bolt can be constructed variously to suit intended performance requirements. For example, the sleeve can be of nonuniform cross section such that the sleeve portions on either side bolt 26, such as portions 18a and 20a in FIG. 6, are of equal length with portion 18a being heavier by virtue of greater cross sectional area of the sleeve along this portion. The cutting end of the sleeve can also be of various configurations in accordance with the type of material in which a mounting hole is to be provided.

Accordingly, the invention is not to be limited by what has been particularly shown and described except as indicated in the appended claims.

What is claimed is:

1. A toggle bolt comprising:
   a generally tubular sleeve having on an end thereof a toothed cutting configuration suitable for cutting a circular opening through a wall to which the toggle bolt is to be mounted;
   an internally threaded collar pivotally mounted in said sleeve at a position along the longitudinal axis of the sleeve providing a heavier portion between said collar and one end and a lighter portion between said collar and the opposite end of said sleeve;
   a slot provided in the wall of said sleeve extending longitudinally between said collar and said opposite end;
   a threaded bolt threadably mated with the collar and having a diameter less than the width of the slot and operative to pass through said slot into longitudinal generally coaxial alignment with said sleeve; and
   an opening through the wall of said sleeve confronting said collar permitting threading of said bolt through said collar and passage through said opening into generally transverse position with respect to the longitudinal axis of said sleeve;
   said threaded bolt being operative in a first position with the bolt extending transversely through the sleeve to provide first and second outwardly extending handles for manual rotation or reciprocation of said sleeve to cause said cutting configuration to cut a circular mounting opening through a wall, and after cutting of the mounting opening by said cutting configuration to be threaded out of said sleeve wall opening and pivoted through said slot into a second position in longitudinal generally coaxial alignment with said sleeve and operative to push said sleeve through the mounting opening in said wall.

2. The toggle bolt of claim 1 wherein said sleeve is of substantially uniform wall thickness and wherein said collar is pivotally mounted in said sleeve at a position offset from the longitudinal center of the sleeve to provide as said heavier portion a longer portion between said collar and one end of the sleeve.

3. The toggle bolt of claim 1 wherein said toothed cutting configuration includes a plurality of cutting teeth circumferentially arranged around an end of said sleeve.

4. The toggle bolt of claim 1 wherein said slot extends longitudinally along the entire length of said sleeve.

5. The toggle bolt of claim 1 wherein said collar includes first and second pivot pins outwardly extending from respective opposite sides of said collar to define a pivotal axis;
   said sleeve having openings in the wall thereof in which said pivot pins are mounted for pivotable disposition of said collar within said sleeve.

6. The toggle bolt of claim 1 wherein said heavier portion is cylindrical, with said cutting configuration integral with said one end.

* * * * *